(12) United States Patent
Ascari et al.

(10) Patent No.: US 6,966,254 B2
(45) Date of Patent: *Nov. 22, 2005

(54) DEVICE FOR PEELING PULPY FRUITS, HAVING AN ADJUSTABLE CUTTING DEPTH

(75) Inventors: Carlo Ascari, Cavezzo (IT); Luca Ascari, Cavezzo (IT)

(73) Assignee: A.B.L. s.r.l., Cavezzo (IT)

( * ) Notice: Subject to any disclaimer, the term of this patent is extended or adjusted under 35 U.S.C. 154(b) by 12 days.

This patent is subject to a terminal disclaimer.

(21) Appl. No.: 10/909,378

(22) Filed: Aug. 3, 2004

(65) Prior Publication Data

US 2005/0028686 A1 Feb. 10, 2005

(30) Foreign Application Priority Data

Aug. 5, 2003 (IT) .......................... MO2003A0228

(51) Int. Cl.[7] .......................... A23N 7/00; A47J 17/00; A47J 17/14; A47J 17/16; A23L 1/00
(52) U.S. Cl. .......................... 99/489; 99/491; 99/546; 99/584; 99/588; 99/589; 99/636
(58) Field of Search .......................... 99/539–546, 584, 99/588–599, 486–492, 600–643; 426/481–483

(56) References Cited

U.S. PATENT DOCUMENTS

| 6,237,475 B1 * | 5/2001 | Ascari et al. .................. 99/540 |
| 6,740,347 B2 * | 5/2004 | Ascari .......................... 426/231 |
| 6,796,224 B2 * | 9/2004 | Ascari et al. .................. 99/489 |

* cited by examiner

Primary Examiner—Timothy F. Simone
(74) Attorney, Agent, or Firm—Young & Thompson

(57) ABSTRACT

The invention relates to a device suited to peel pulpy fruits, like citrus fruits, mango, kiwi, papaya, apples, pears, and particularly oranges and other fruits whose skin has not a uniform thickness. The peeling of fruits whose skin has an uneven thickness is made possible by the fact that the inventive device is equipped with a mechanism capable of varying continuously—according to a program—the amount of projection of the peeling tool relative to the feeler device, in the peeling step. The device is applicable to any kind of peeling machine, or to a machine that foresees a peeling step.

20 Claims, 13 Drawing Sheets

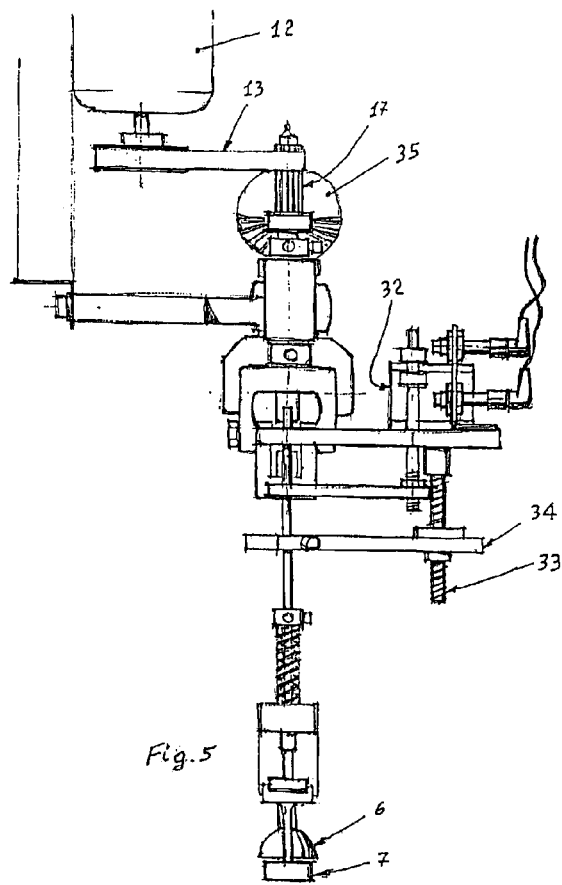
Fig. 5
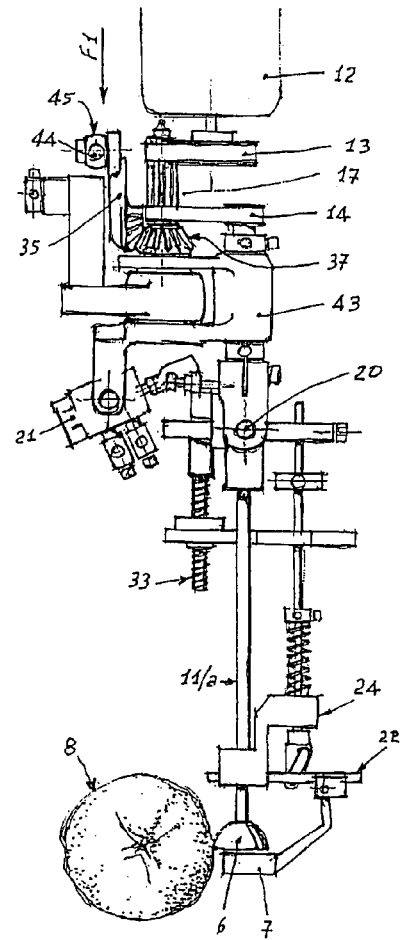
Fig. 6
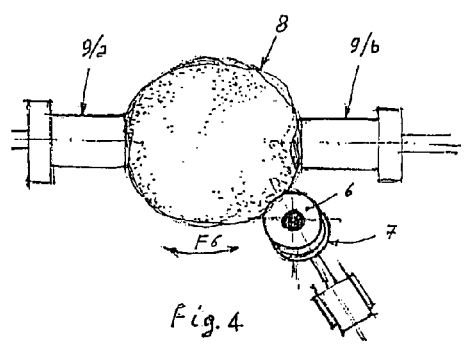
Fig. 4
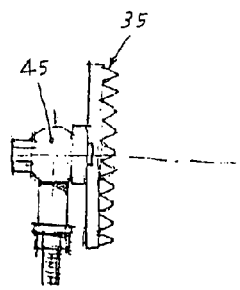

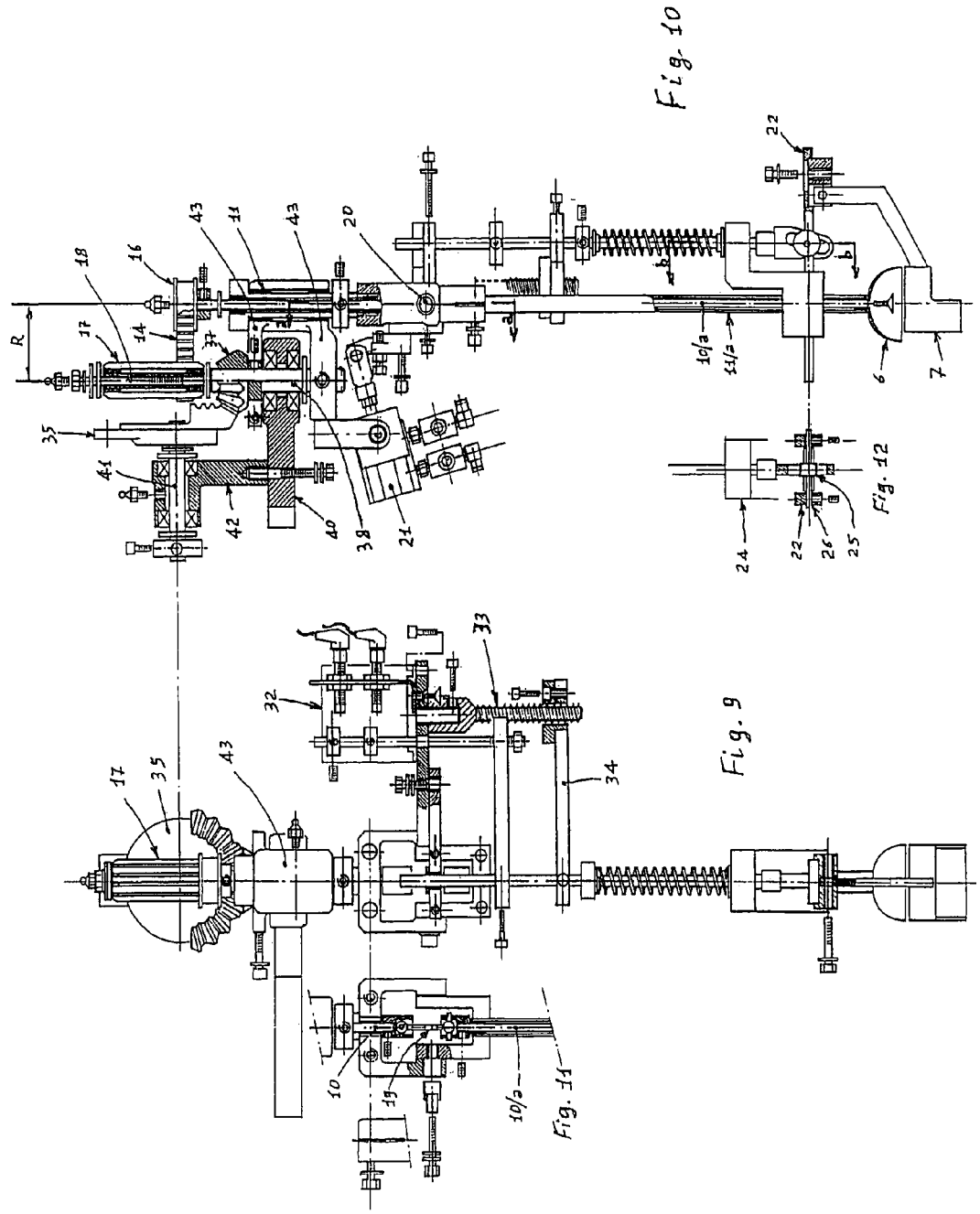

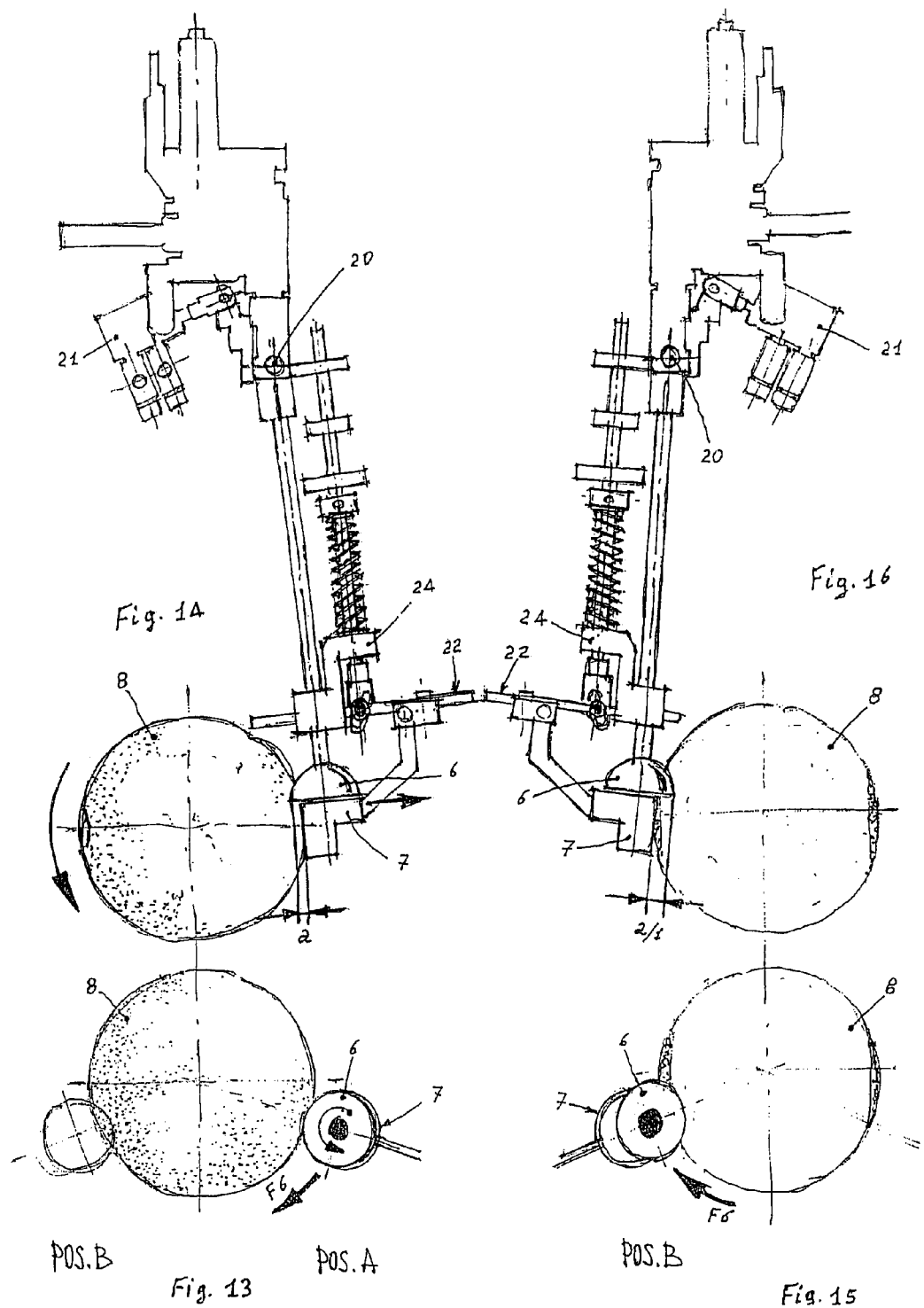

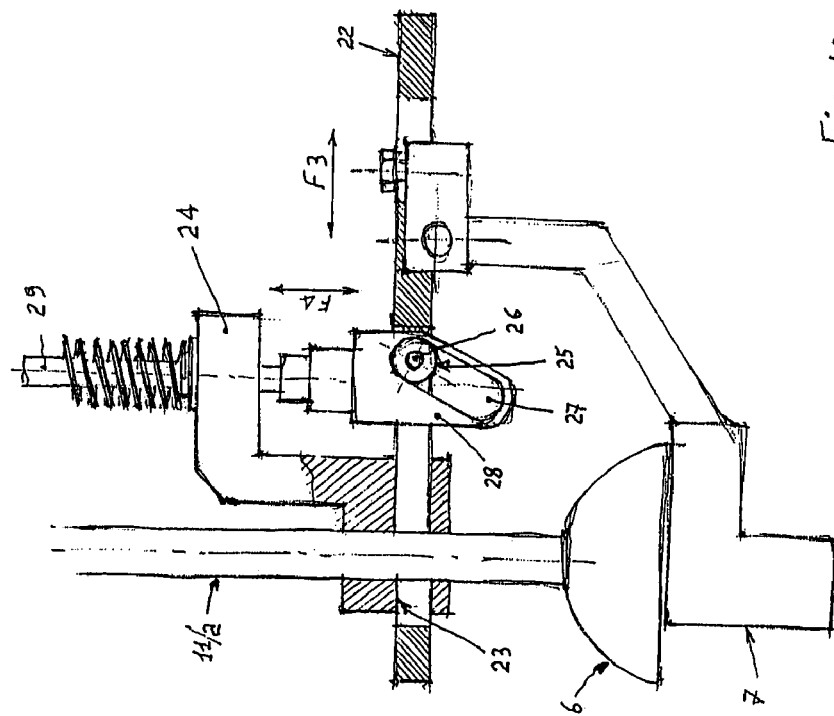
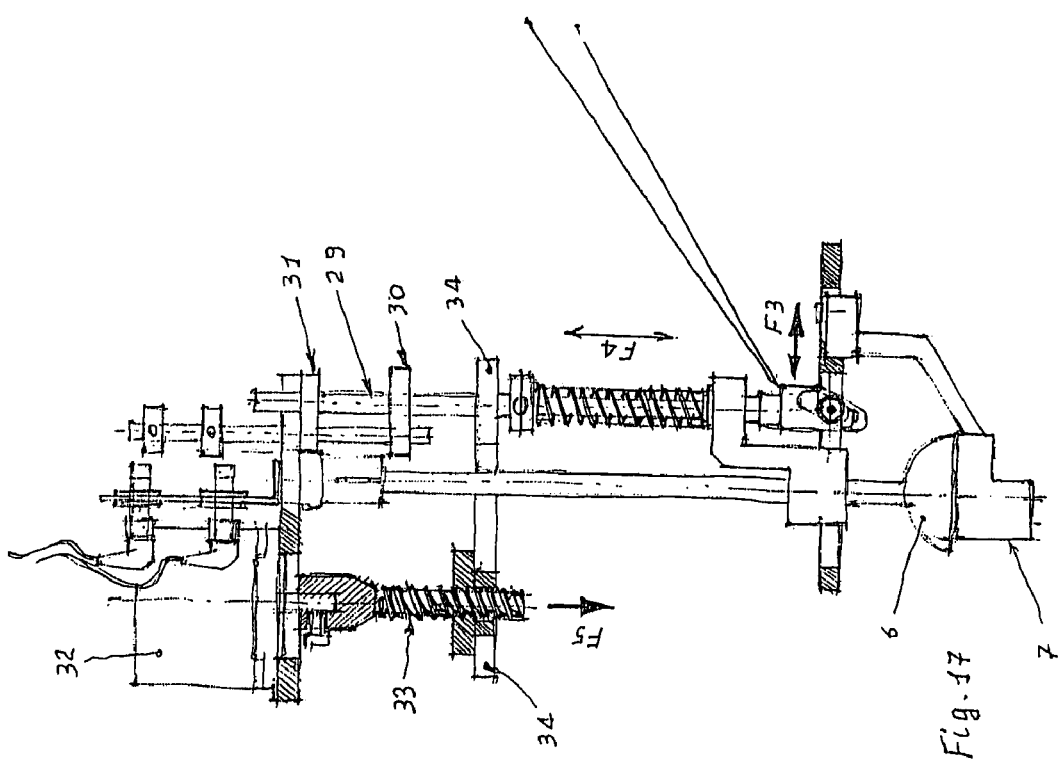

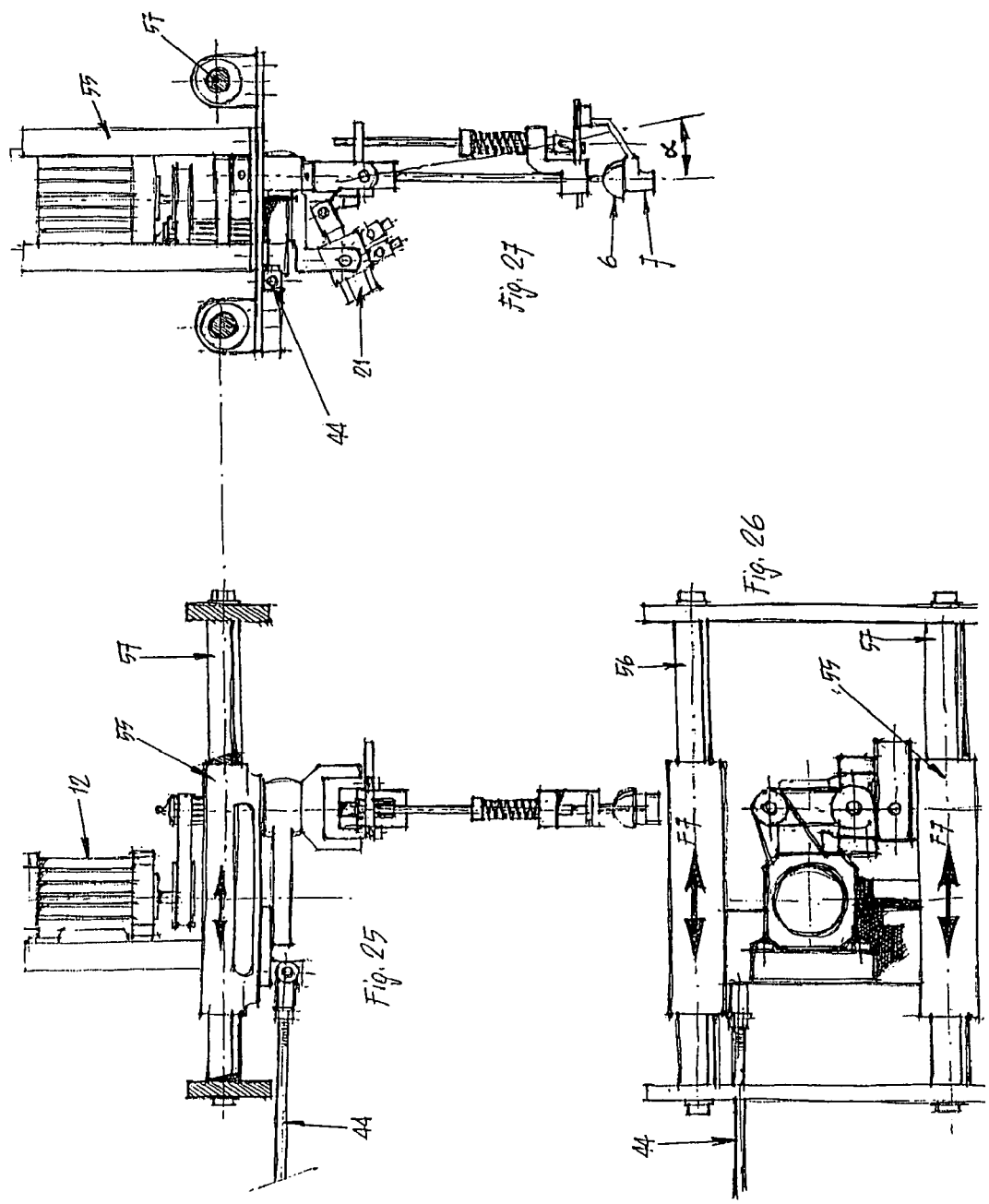

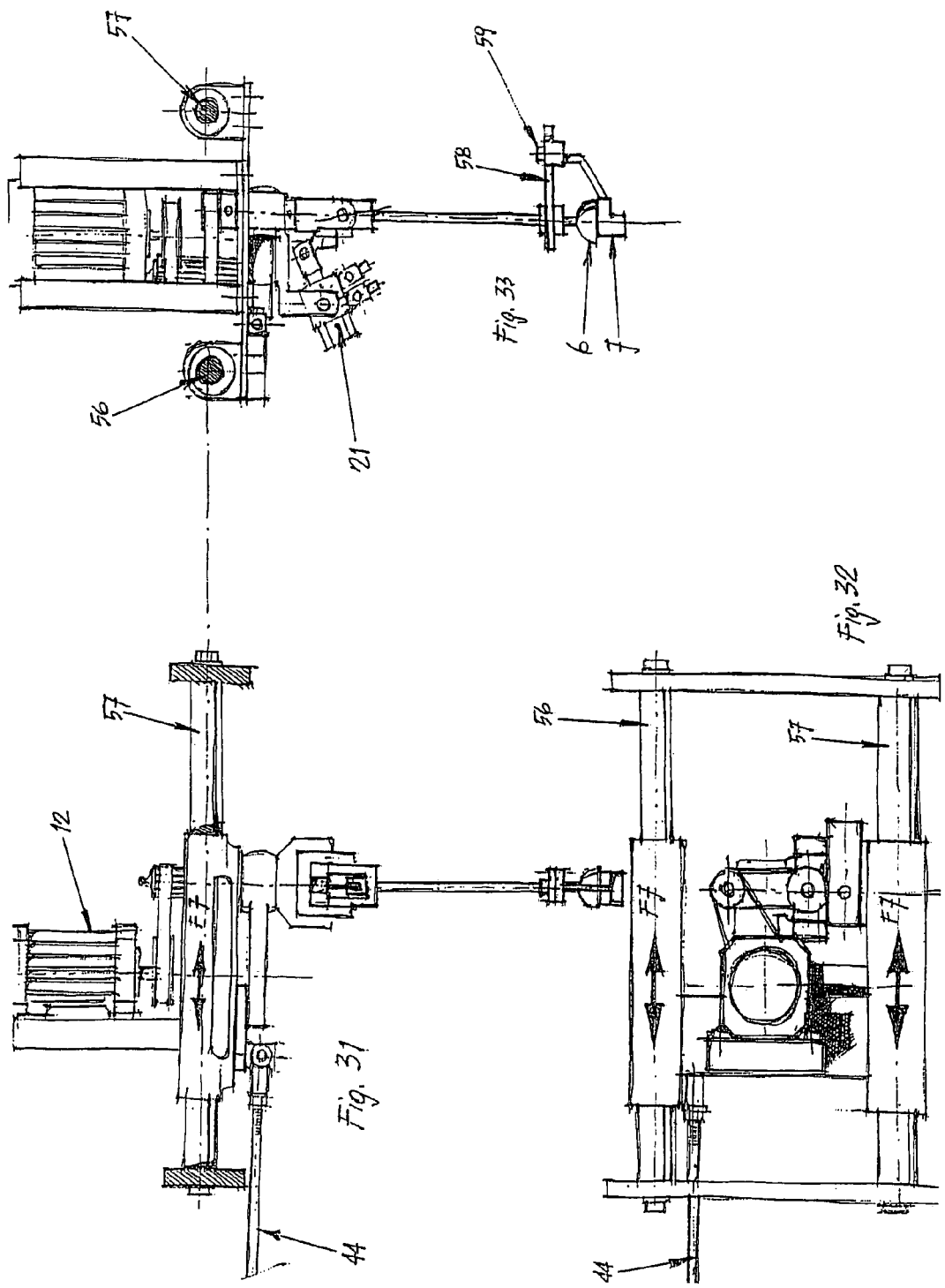

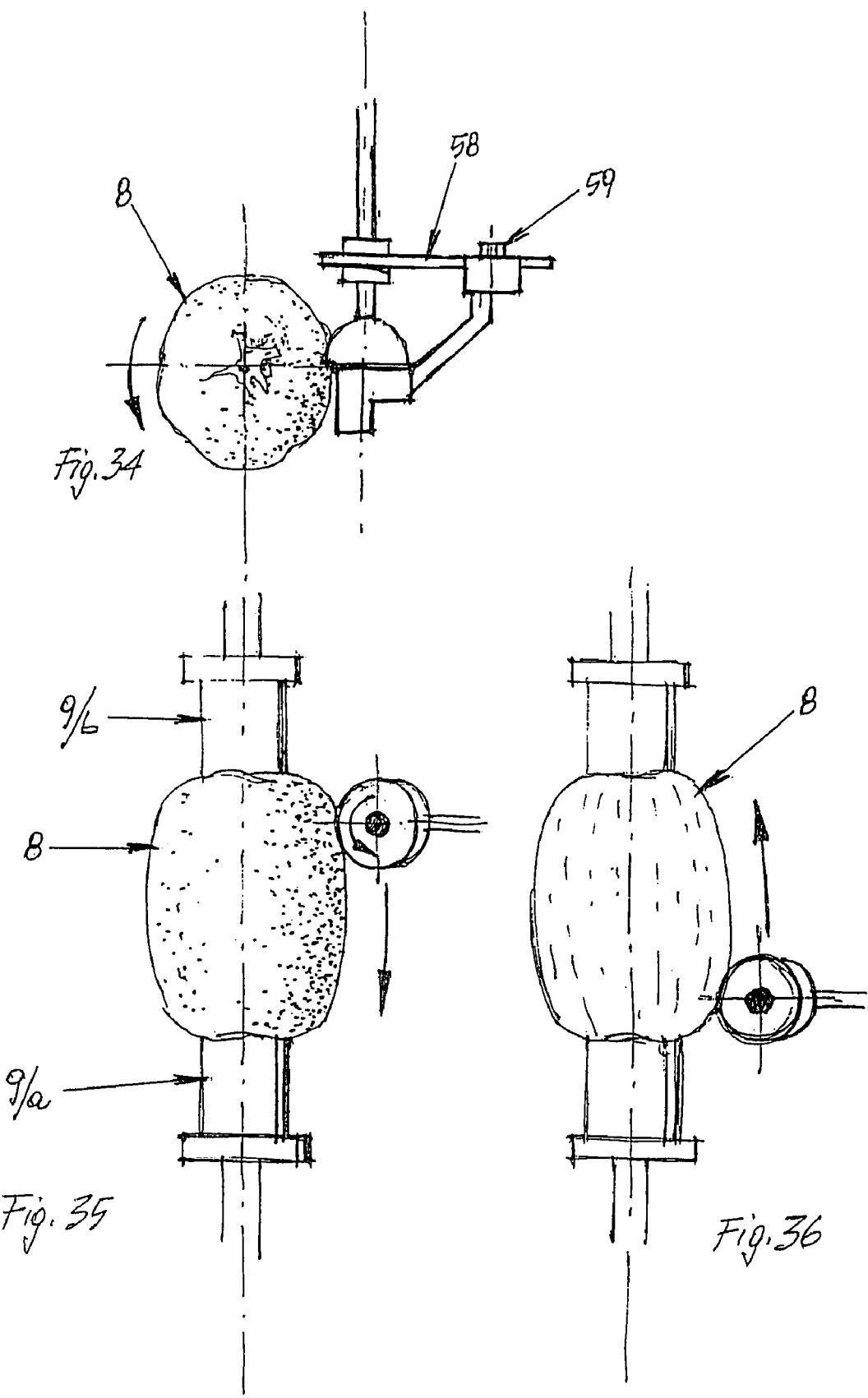

DEVICE FOR PEELING PULPY FRUITS, HAVING AN ADJUSTABLE CUTTING DEPTH

FIELD OF THE INVENTION

The present invention relates to a device suitable to peel pulpy fruits, such as fruits derived from citrus fruits, or from the Cashew family, like mango, or from the family of actinidiaceae, like kiwi, or from the Pawpaw family, like papaya, or the like, and particularly fruits such as oranges which have a non uniform thickness of their skin.

BACKGROUND OF THE INVENTION

Devices suitable to peel fruits like apples, pears, etc., on industrial machines, are known since a long time and they are of different kinds. A feature in common to all of them, independently of the mechanisms used to carry out the movements, of the motions imparted to the fruits to be peeled, or of the kind of peeling instrument, consists in the possibility of manually setting beforehand the projection of the peeling instrument with respect to a feeler or abutment means, which is in contact with the external surface of the fruits, with the aim to determine the value of the thickness of the peel that must be removed. This value, once it has been set, will remain the same until one manually intervenes to change it.

According to surveys performed on various typologies of fruits, like—for instance—citrus fruits, it has been observed that although the majority of fruits have a uniform peel thickness throughout their surface, there are fruits which naturally have a peel with a non uniform thickness; among the latter fruits, we mention the oranges, in which the thickness of the epicarp, added to the mesocarp, gradually varies starting from the "pole", where the fruit is attached to the peduncle, to the opposite "pole", this continuous variation of the thickness being considerable since it may reach 2–4 mm. In some sorts of lemons and citrons the peel thickness is considerable at the poles and decreases little by little towards the equatorial zone.

Among conventional machines designed for the industrial processing of fruits, that also provide for the peeling step, there are no examples of machines allowing to vary automatically the peeling depth during processing.

The fact that the instrument's projection cannot be varied with respect to the abutment means during the peeling step, implies a few inevitable consequences:

a) it makes impossible to propose a peeling of fruits like oranges, for instance, which (see above) due to their intrinsic nature present a considerable variation of the skin thickness between the two poles;

b) a certain percentage of fruits will present residues of the skin and these fruits have to be discarded from the production line;

c) in a certain percentage of fruits their edible pulp will be removed in some zones thereof, thereby causing a reduction of productivity.

An object of the present invention is to propose to all manufacturers of industrial machines used for peeling, and/or of machines which in the processing cycle include the peeling step, a device adaptable and usable in any kind of machine for the processing of fruits.

A further object of the invention is to render possible the peeling of fruits which—like oranges—have a variable value of the peel thickness.

A further object is to insure high yield percentage values in the production, reducing almost to zero the waste due to partial peeling or too deep peeling.

Another achievement is that the peel is removed in the form of an individual, spiral-shaped piece, and this facilitates its recovery in those cases where the peel is utilised as well.

SUMMARY OF THE INVENTION

These and other objects are attained by means of an inventive device, comprising a motorised tool that performs a rotary motion and which, with respect to the fruit, can move both radially, and in an orbital manner from one pole of the fruit to the other pole of the fruit, the device being characterised in that it comprises:

- a feeler device, which in the peeling step is constantly elastically in contact with the surface of the fruit, to allow the tool to follow the profile and size of the fruit, this tool being suited to cut and remove the skin in the form of a single spiral-like piece (shaving);
- a mechanism for rotating the tool with a transmission shaft formed by two half-shafts (half-spindles) connected to each other by an articulated joint;
- a mechanism for moving the tool away from a peeled fruit and for causing its return to a position in contact with a successive fruit to be peeled, and maintaining the tool in contact with the latter during the whole peeling step;
- an electronically programmable mechanism, allowing to vary the projection of the tool relative to said feeler device, in order to adjust, according to a selected program, the thickness value of the skin removed during the peeling step;
- a mechanism allowing to impart to the tool an orbital movement around the fruit, from one pole of the fruit to the other, in order to be able to peel generally spherical fruits, or alternatively, a mechanism which imparts a linear reciprocating motion to a slide supporting said mechanisms used to motorise the tool and to adjust the displacement of the latter with respect to the feeler device;
- a cam that controls the orbital movement of the tool according to various parameters, like the size and shape of the fruit, the rpm (rounds per minute) imparted to the fruit, the advancement of the tool for each single turn of the fruit during the orbital movement; and alternatively, a cam for controlling the alternate (reciprocating) displacement of the slide according to said parameters;
- a program software, a distance transducer, and a step motor, allowing to program said electronically programmable mechanism which permits to vary the projection amount of the tool relative to the feeler device, in the peeling step; and finally,
- transmission and connection means with respect to other mechanisms belonging to the machine on which the peeling device is to be used, these means being utilised to synchronise the machine's functions.

BRIEF DESCRIPTION OF DRAWINGS

Further features and advantages of the present invention will more clearly result from the description of two preferred but non limitative embodiments of the device, which are illustrated for exemplificative but non binding purposes in the attached drawings, wherein:

FIGS. 4, 5 and 6 illustrate a first embodiment of the device of the present invention, according to three orthogonal views, FIG. 4 being a partial view;

FIG. 6/bis shows in detail the mechanism which imparts the orbital displacement to the tool (instrument), as seen in the direction of arrow F1 in FIG. 6;

FIGS. 9–10 also correspond to FIGS. 5, 6, but differ from the latter in that they are sections allowing to distinguish—and focus on—the various particulars of the mechanisms;

FIG. 11 is a cross-section taken in the plane denoted by a—a in FIG. 10;

FIG. 12 is a cross-section taken in the plane indicated by b—b in FIG. 10;

FIGS. 13, 14 show—in two orthogonal views—the position occupied by the tool (instrument) with respect to the fruit, at the beginning of the peeling step;

FIGS. 15 and 16 show—in two orthogonal views—the position occupied by the tool with respect to the fruit at the end of the peeling step;

FIG. 17 also shows, in detail, the peeling tool or instrument;

FIG. 18 is an enlarged view of the tool-and-feeler zone, also showing part of the means employed to realise the mutual displacement between the tool and feeler;

FIG. 20 is a diametrical section taken in the plane c—c of FIG. 21;

FIGS. 25, 26 and 27 are three orthogonal views of a second embodiment of the peeler device according to the invention, which is suitable to peel fruits having a more or less regular cylindrical shape, such as lemons, mango, kiwi, papaya, and which is provided with a device for automatically varying the peeling depth during the processing;

FIGS. 29 and 30 respectively show the tool position at the beginning and end of the peeling step, FIGS. 31, 32, 33 are three orthogonal views of the same realisation depicted in FIGS. 25, 26, 27; now, no device for automatically varying the peeling depth is shown;

FIGS. 34, 35, 36 are analogous to FIGS. 28, 29, 30 but refer to the version shown in FIGS. 31, 32, 33.

DETAILED DESCRIPTION OF THE PREFERRED EMBODIMENTS

Figure 2:
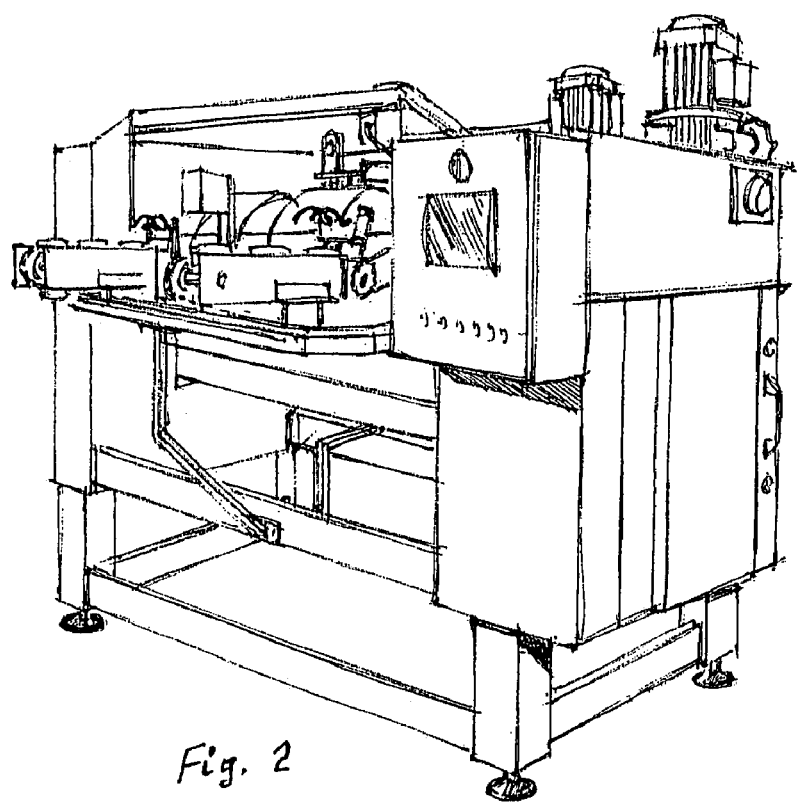
FIGS. 1 and 2 schematically show, from two opposite angles of observation, a machine suited to peel oranges and including two processing lines.
Figure 1:
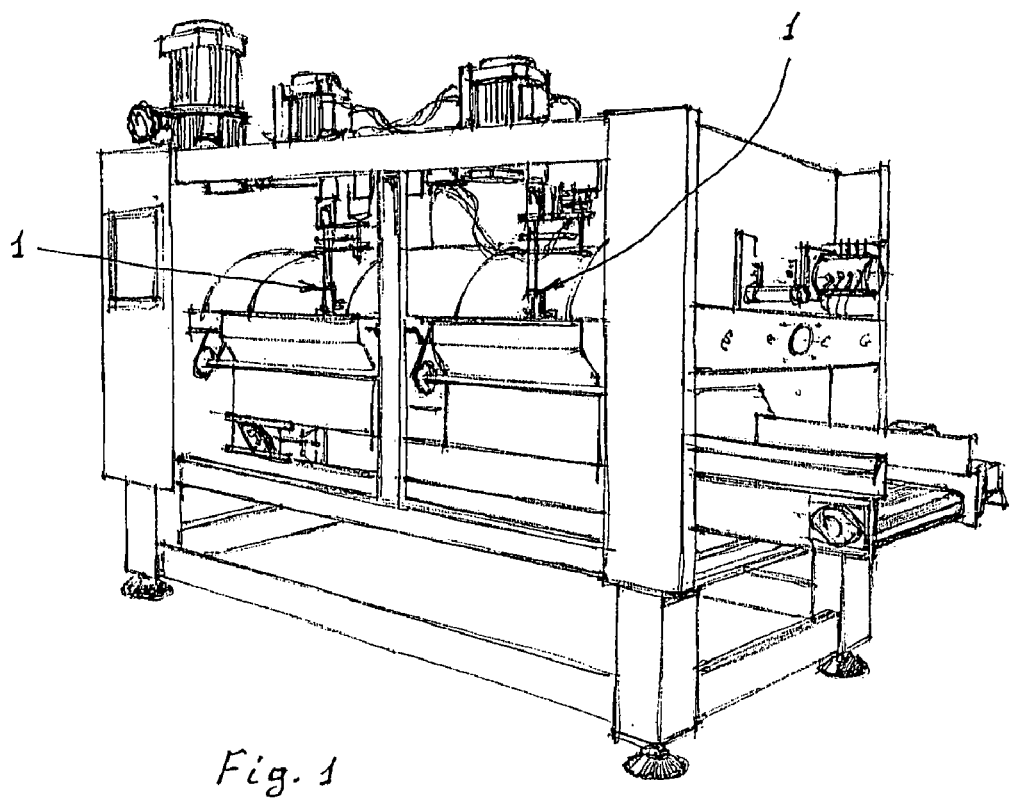
Figure 3:
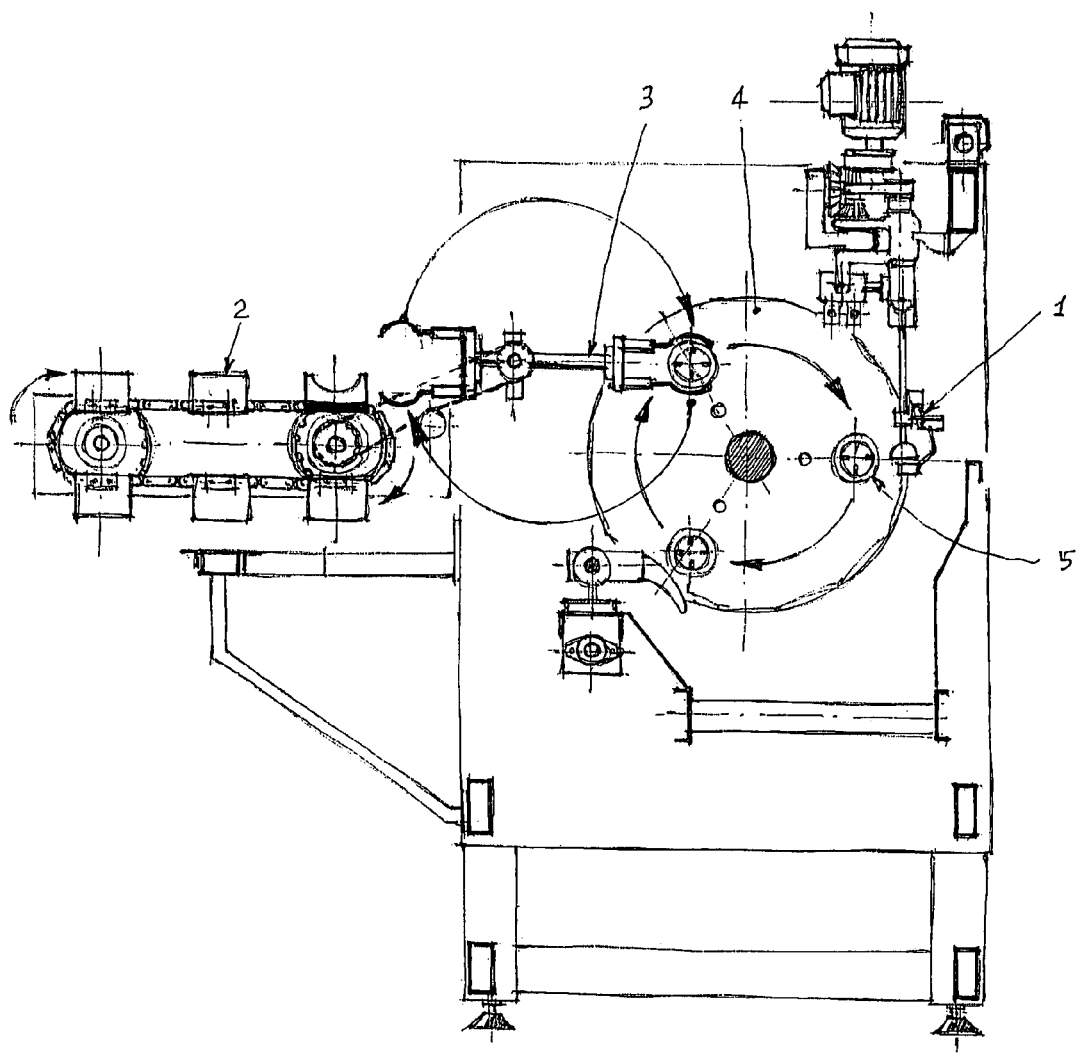
FIG. 3 shows in more detail the machine of FIGS. 1 and 2, the device according to the invention being highlighted with regard to its form and the position occupied by it inside the machine assembly.
Figures 7, 8:
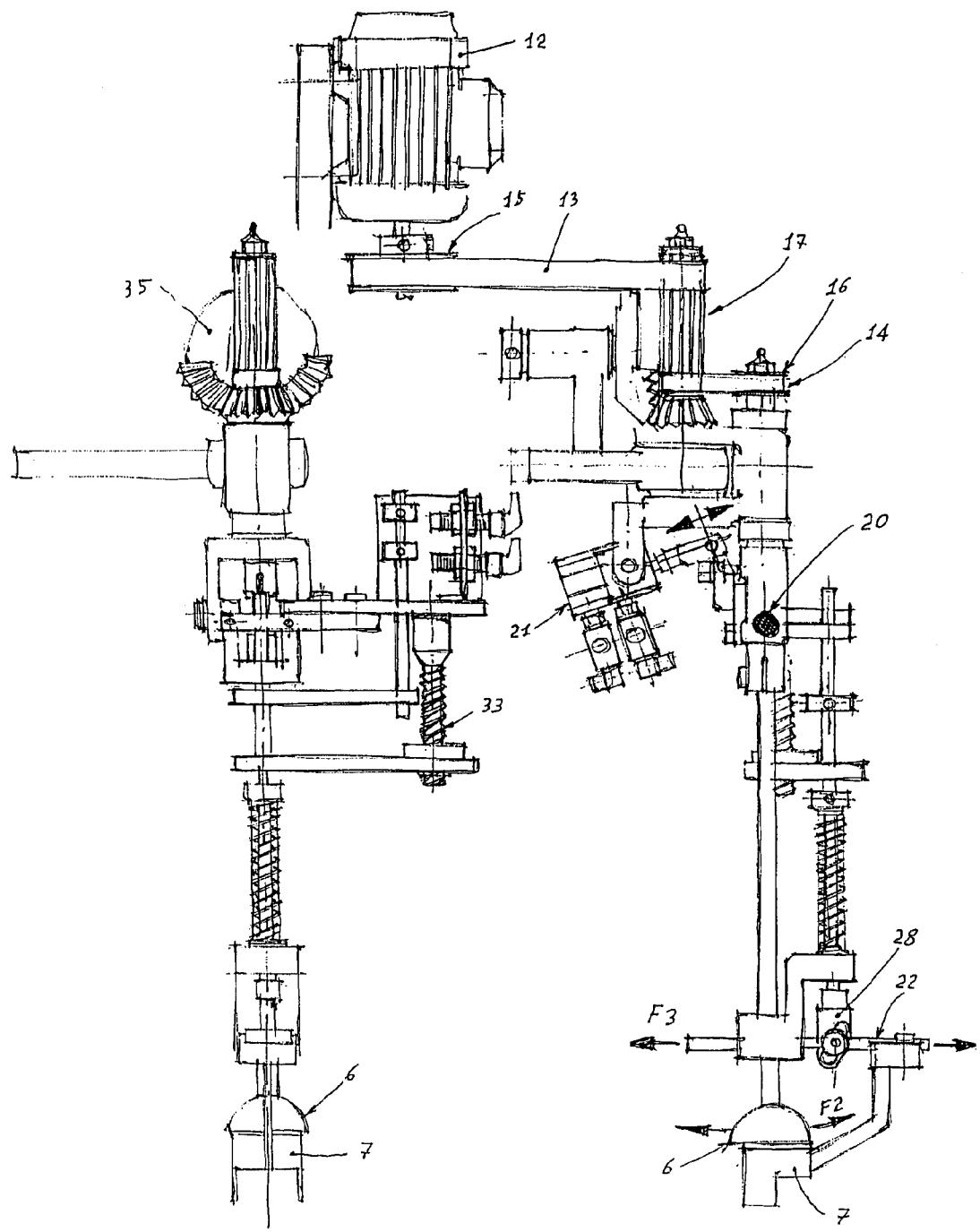
FIGS. 7, 8 are equivalent to FIGS. 5, 6, and in these figures there are indicated—by means of arrows—some of the possible mutual displacements of the various components.

In all figures, the same alphanumeric references indicate the same parts or elements. Referring to FIGS. 1 and 2, they schematically and generally show a machine for peeling oranges, suited to work simultaneously along two production lines, and in which numeral 1 jointly denotes the two peeling devices of the present invention, which are present on the machine, so that their location can be defined inside the illustrated machine. In FIG. 3 the location (arrangement) of the peeling device 1 is even more evident; note that the schematically illustrated machine is again the same machine of FIGS. 1 and 2. This third figure shows: the chain conveyor 2 that feeds the fruits, a manipulator 3 that transfers the fruits from the chain conveyor 2 towards a rotatable assembly 4, and finally, the processing position 5 in which the peeling step is actually performed with the aid of the device 1. FIGS. 4, 5 and 6 generally show a first version of the peeling device according to the present invention that is particularly suitable to peel fruits with a generally spherical shape, e.g. oranges; from these figures we may already recognise the tool or instrument 6, the feeler device 7, the fruit 8 to be peeled, and mandrels 9/a and 9/b used to support and set the fruit 8 in rotation—these mandrels 9/a, 9/b being part of the machine on which the peeling device of the present invention is utilised and mounted. From the present figures and the following ones it may be seen that the tool 6, forming a cap chamfered on its external edge, is made integral with a spindle 10–10/a (see FIGS. 10, 11), this spindle 10, 10/a being received inside a tubular rod 11, 11/a which protects the former; moreover, the spindle is set in rotation by a mechanism, which, in the illustrated embodiment includes: a motor 12, toothed belts 13 and 14, pulleys 15 and 16, and a toothed sleeve 17 which is idly mounted on (around) a shaft 18. The spindle 10–10a is realised in two parts, denoted 10 and 10a respectively, which are connected to each other by an articulated universal joint 19 in order to allow section 10a to tilt, in the manner shown in FIG. 14, to adapt to the diameter of the fruit 8. Obviously, also the tubular rod 11–11/a should be able to tilt, and therefore the latter is hinged at 20 in any known manner; moreover, arrow F2 (FIG. 8) indicates the directions of oscillation of the spindle section 10/a and tubular rod section 11/a, so that the feeler device 7 may adapt to the size of the fruit and to possible irregularities of its ideally circular form, thereby constantly abutting on the fruit's surface. This movement, together with the requirement of adaptation and maintenance of the contact between the feeler device 7 and the external surface of the fruit 8, are obtained by the introduction of a pneumatically actuated linear actuator 21 (double-acting pneumatic cylinder) which may be applied in any known manner to the tubular rod 11/a, so that, in one direction the actuator moves the small tool head 6-7 away in order to allow the fruit to reach the position where it will be peeled, and in the opposite direction, it realises an elastic contact of the feeler device 7 on the fruit 8 itself. To insure a sufficient but not excessively strong elastic contact or thrust, corresponding to a constant thrust value that at the same time possibly eliminates or renders negligible the so-called stick-slip effect, the air pressure inside the actuator 21—responsible for the contact between the feeler device 7 and the fruit 8—, is adjusted by a pressure regulator of a kind including an overpressure discharge hole; moreover, the actuator 21 may be of any known kind, with no gaskets.

Figure 28:
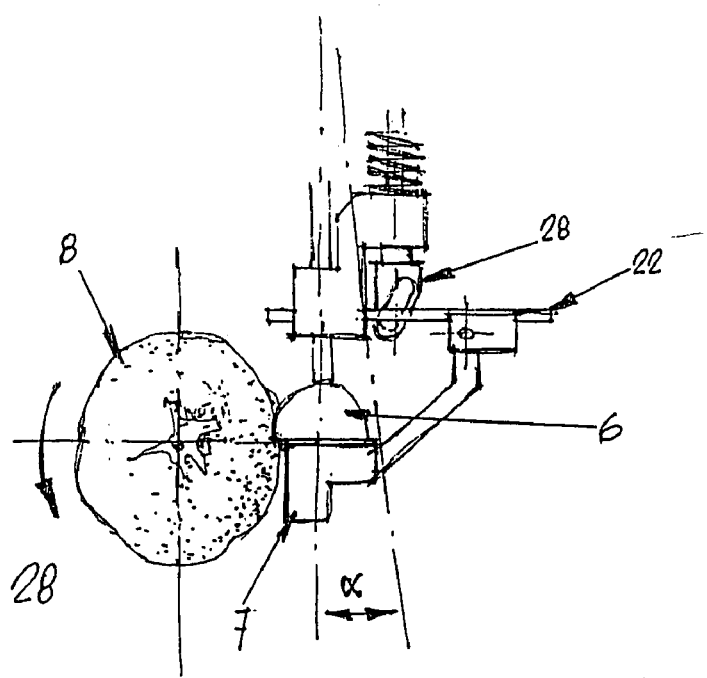
FIGS. 28 and 29 are two orthogonal views showing the mutual positions occupied by the fruit and tool during peeling.
Figure 29:
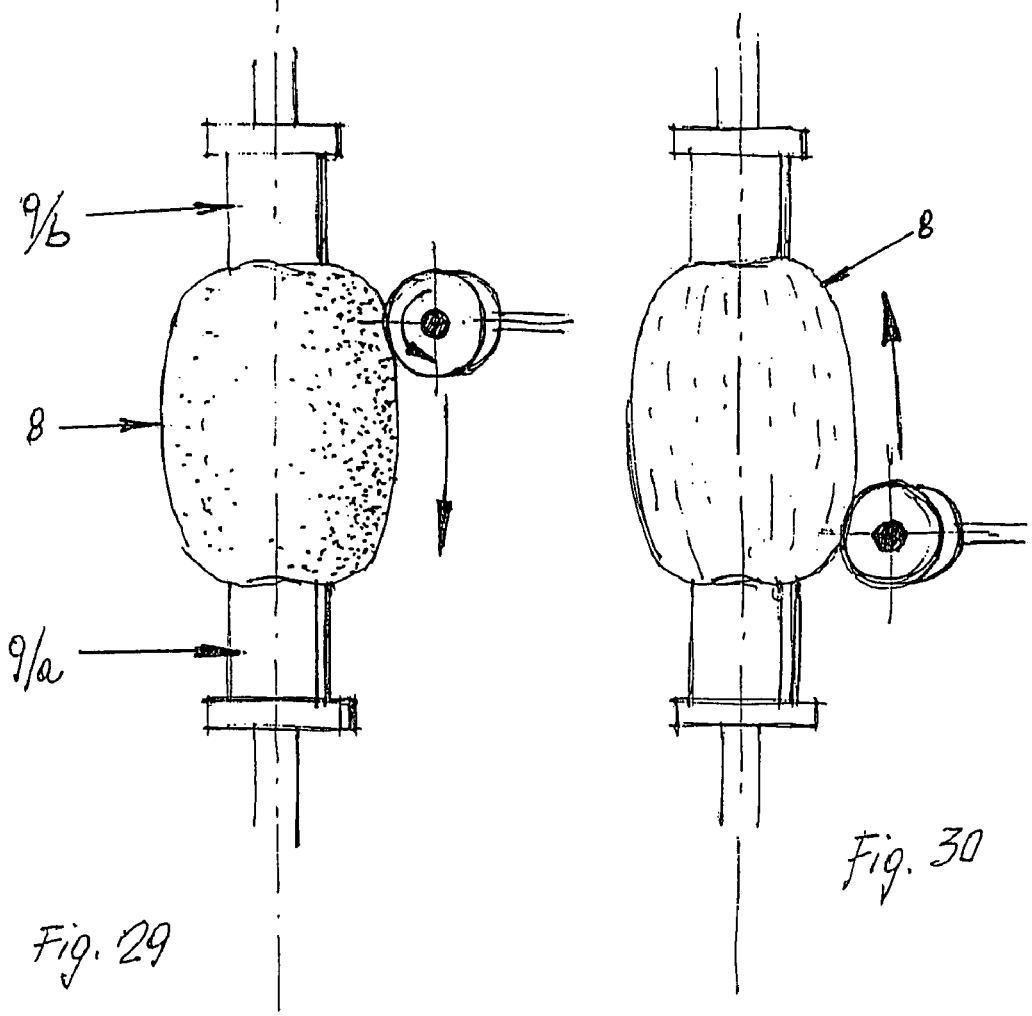
Figure 30:
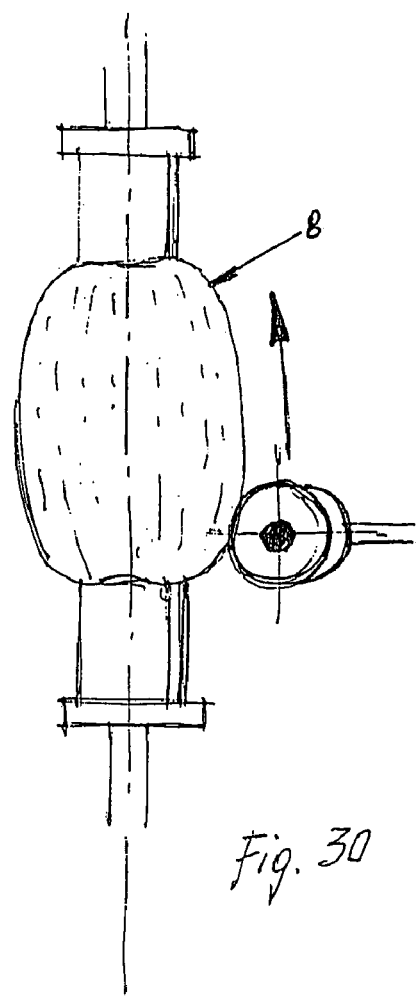

In order to enable a variation of the "level" a–a/1 (FIGS. 14–16), that is, to allow a variation of the penetration depth during the peeling step, the feeler device 7 (see FIGS. 17–18) is made integral with a slide 22 movable both axially and horizontally (perpendicularly to the axis of the tubular sleeve 11/a), according to the arrow F3, inside a guide 23 obtained inside a support 24 which in turn is integral with the tubular sleeve 11/a; moreover, on the slide 22 there is a small roller 25 that is supported by a pin 26 (see FIG. 12), said small roller sliding inside a slot 27 obtained in a small head 28 which is supported by a rod 29; the latter is guided inside holes obtained on the support 24 and on brackets 30–31 which are integral with the structure supporting—among other things—the tubular sleeve 11/*a*. If the rod 29 is axially moved in the directions indicated by the arrow F4, the slide 22 moves correspondingly in the directions denoted by the arrow F3, because the slot 27 is inclined with respect to the axis of the rod 29; therefore, the feeler device 7 is moved at the same time relative to the tool 6, thereby changing the value of the penetration depth used for the removal of the skin. The axial movement of the rod 29 is adjusted in steps of a hundredth of millimeter, using a step motor 32 and a distance transducer (not shown), the latter being utilised for adjusting the rotation direction as well as the rotational speed of a screw 33; the latter, is used in turn to displace a bracket 34 in the directions indicated by the arrow F5, said bracket being integral with the rod 29; moreover, the movements of the shaft of the motor 32 are controlled by means of an appropriate programming software. The assembly formed by the tool 6, the feeler device 7, and the whole mechanism performing the displacement of the feeler device 7 with respect to the tool 6 (including e.g. the step motor 32), besides being capable of varying its tilt as indicated in FIGS. 27 and 28—due to the fact that this assembly is hinged at 20—, should also be capable of effecting another movement, that could be defined as "orbital" movement from one pole to the opposite pole of the fruit (see FIGS. 4, 13, 14, 15, 16 and the arrow F6). In order to "implement" this orbital movement (see FIGS. 5, 6, 6/bis and the following ones up to the sheet of drawing 8), a wheel 35, which is only partially serrated (toothed) and has a conical gear part 36, engages with a conical pinion (bevel gear) 37 integral with the shaft 38 (see FIGS. 11, 12); moreover, the shaft 38 is idle on the support 40. The wheel 35 is integral with the shaft 41 borne by the support 42; the supports 40 and 42 could possibly be fixed to each other, but in any case they are fixed—at appropriate positions—to the machine structure, where the peeling device of the present invention is to be used. Moreover, the shafts 38, 41 are obviously orthogonal to each other. A fork 43 is also inserted on the shaft 38 and fixed thereto, and this fork, in turn, supports the whole mechanism (except for the motor 12) used to drive the tool 6.

Figure 19:
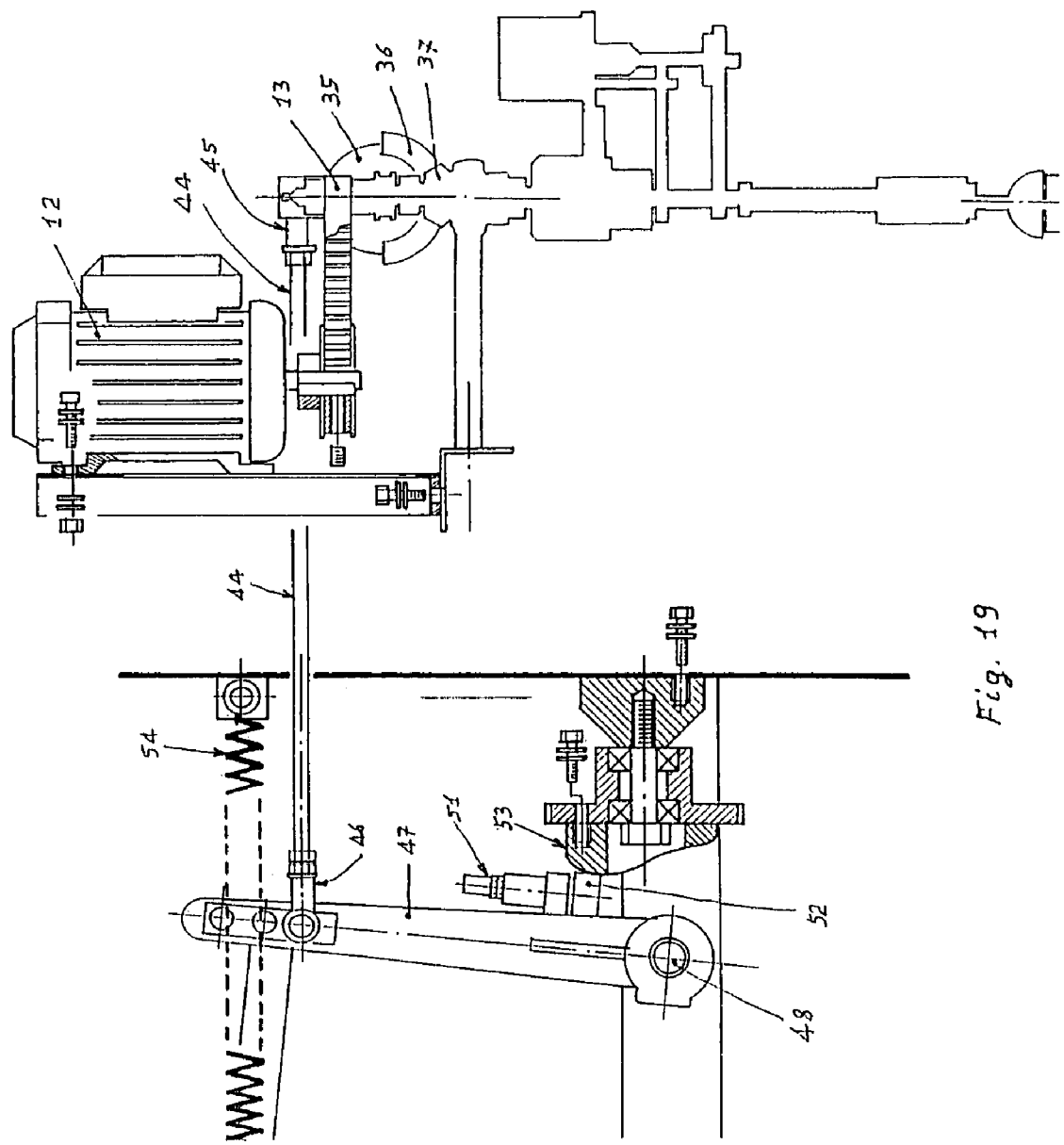
FIG. 19 shows part of the mechanism accomplishing the orbital displacement of the tool between the two poles of the fruit.
Figure 20:
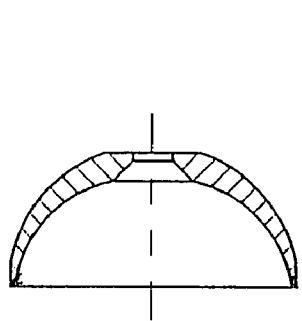
FIGS. 20 and 21 show in more detail the peeling tool.
Figure 21:
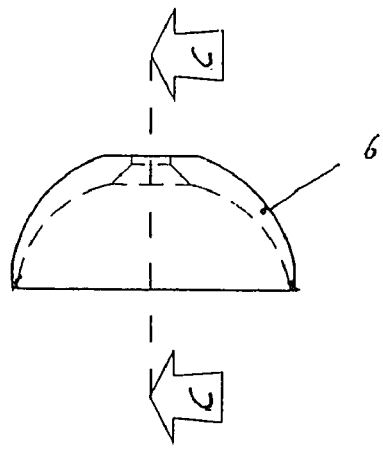
Figure 22:
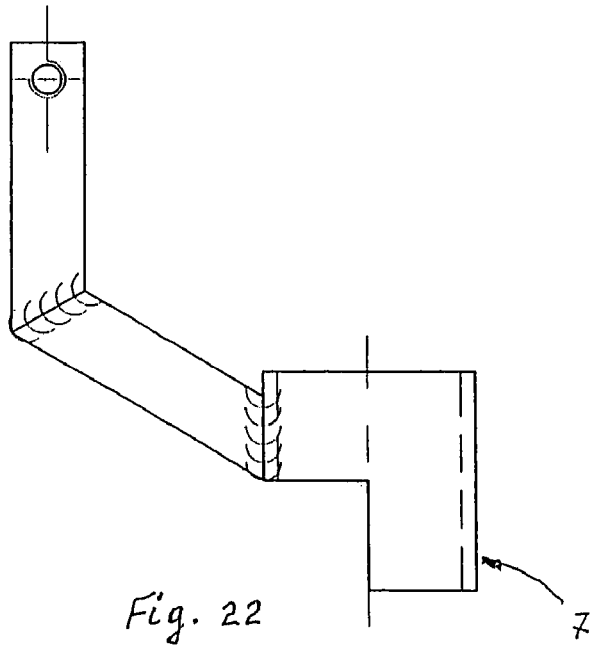
FIGS. 22, 23 and 24 are three orthogonal (detailed) views of the mechanical feeler device.
Figure 24:
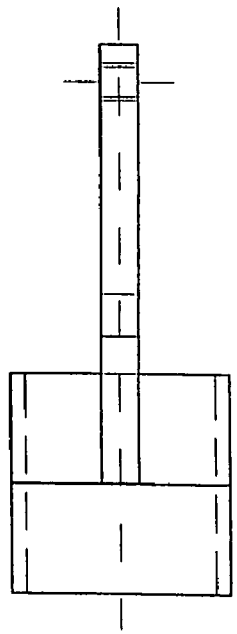
Figure 23:
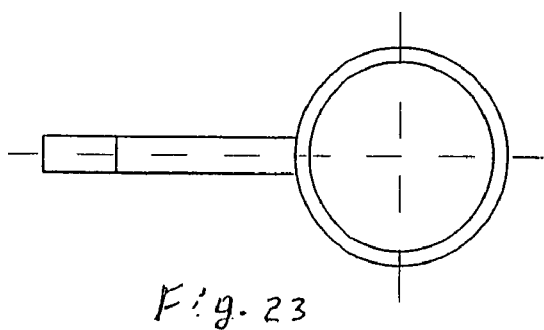

By alternately driving the wheel 35, the fork 43 alternately rotates around a circle of radius "R" (see FIG. 10), thereby carrying with it the whole driving mechanism of the tool 6, and the mechanism responsible for the displacement of the feeler device 7 relative to the tool 6 (see FIGS. 4, 13, 14, 15, 16) as indicated by the arrow F6. The mechanism that drives the wheel 35 is depicted in FIG. 19 and includes a rod 44, whose ends are respectively linked, by spherical joints 45, 46, to the periphery of the wheel 35 (see FIGS. 6 and 6/bis) and to the end of a lever 47 (FIG. 19); the latter is rigidly fitted at its other end on a pin 48 that is rotatably mounted in a support 49; a stub 50 is integrally inserted in the opposite end of the pin 48, said stub having a pin 51 which carries a roller 52 abutting on a frontal cam 53, which in turn may be motorised in any conventional manner and synchronised with respect to the movements of the other mechanisms of the machine on which the peeling device of the present invention is mounted. The support 49 is made integral with the structure or basement of the machine, in an adequate position and using any conventional means. The cam 53 is appropriately designed in such a way that the tool 6—taking account of the form and size of the fruit 8, of the fact that the feeler device 7 constantly abuts the surface of the fruit 8, of the rpm imparted to the fruit, and of the advancement of the tool during each turn of the fruit—is capable of peeling the fruit during its orbital displacement from one pole of the fruit to the opposite pole of the fruit. A spring 54 insures that the roller 52 is always in contact with the cam 53; the cam 53, the lever 47, and all components of the mechanism used to perform the orbital movement of the tool 6, are part of the peeling device of the present invention. FIGS. 25, 26 and 27 show a second embodiment of the peeling device according to the invention, this embodiment being particularly suitable to peel fruits having a generally cylindrical form, e.g. kiwi, lemons, citrons, papaya, etc., but also fruits with a pear-like shape, like pears, mango, etc. The difference lies in the omission of the mechanism for performing the orbital motion of the tool 6, and in the replacement of this mechanism by a slide 55 which axially reciprocates along guides 56, 57, as shown by the arrow F7, parallel to the axis of rotation of the mandrels 9/*a* and 9/*b* used to support and rotate the fruit 8.

The slide 55 supports both the mechanism used to drive the tool 6, and the mechanism used to displace the feeler device 7 relative to the tool 6 according to the program (in order to automatically vary the peeling depth when fruits having a non uniform peel thickness have to be peeled, e.g. some sorts of lemons, citrons, etc.). The linear reciprocating motion of the slide 55 is obtained by the same mechanism shown in FIG. 19, whose rod 44, instead of acting on the wheel 35, directly acts on the slide 55.

Obviously, the cam 53 will have an adequate profile suited to allow the peeling, taking account of the parameters which each time influence the peeling, depending on the fruit size and typology.

The mechanism that carries out the programmed displacement of the feeler device 7 relative to the tool 6 could also be absent (FIGS. 31, 32, 33), provided that the respective machine is designed to peel fruits of constant skin thickness, like kiwi, pears, mango, etc.; in this case the feeler device 7 is supported by a bracket 58, which in turn is integral with the sleeve 11/*a*, and the feeler device 7 is then manually displaced from time to time according to the thickness of the skin to be removed, first by loosening and then by tightening a screw 59 used to connect the feeler device 7 to the bracket 58.

As already apparent from the above description of preferred embodiments, the invention will not be limited to the illustrated examples that have been explained only for illustrative purposes. It should be noted that other steps, examples, components and operative processes, which are not to be considered outside the scope of the present invention in accordance with the appended claims, will spontaneously turn up in the mind of a skilled person who has carefully examined the present disclosure.

Thus, for instance, in the inventive peeling device, the feeler device 7 that abuts the surface of the fruit could be manufactured in such a way as to perform a creeping movement, and in this case the size, the form, and the material used to manufacture the same will be appropriately chosen; alternatively, it may carry out a rolling movement, and in this case it could be embodied by a roller or a sphere capable of rotating in all directions like a sphere of a ballpoint pen. The orbital motion which is imparted to the tool in order to peel fruits of generally cylindrical or spherical shapes, could be realised by means of any kind of known and suitable mechanism.

Finally, two things need to be considered. In the first place, in order to provide a clear and concise description of the invention the annexed drawings neither include structural elements allowing to mount and support the device on the machine structure in an adequate position, nor do they include or disclose the connection means which allow to "synchronise" the mechanisms of the machine whereon the device of the invention is applied (for this purpose reference is made to Italian patent application No. MO2002A000322, "Macchina per la sbucciatura industriale dei frutti prodotti dagli agrumi", filed in Modena, on Nov. 6, 2002; applicant: A.B.L. s.r.l., where it will be evident for a skilled person how to mount and interconnect the parts of the machine).

Secondly, the skilled persons in the field of the invention will appreciate that some aspects of the above described invention could be subject to changes in order to adapt to limitations or commercial aspects. For instance, design variants could become necessary depending on the fruit dimensions and shape. The programmable adjustment of the feeler device 7 relative to the tool 6 could be realised by a numeric control drive, or in an oil-dynamic manner by using a miniaturised cylinder that directly acts on the feeler device 7 and introducing in the hydraulic circuit an electro-proportional flow valve or a servo-valve, and connecting all these components in a known manner.

The programmable regulation of the feeler device 7 relative to the tool 6 could also be effected by a mechanical drive, through rotating eccentric means which act—either directly or by the interposition of linkages—on the feeler device 7. Such modifications are to be considered self-evident for the skilled person and could be made without going beyond the scope of the invention.

The operation of the device according to the invention, which requires some preparatory steps, is the following:
a) If a great lot of pears is to be peeled, then this lot should be subdivided into two "gauges";
b) If the fruit belongs to a variety having a constant-thickness skin, then the average thickness should first be detected and the projection of the tool 6 relative to the feeler device 7 be adjusted accordingly;
c) if the fruit belongs to a variety with a variable-thickness skin, a statistical survey of the thickness of the skin to be removed is carried out on each population corresponding to each gauge, at least with respect to three zones, viz., in the vicinity of the poles and along the equatorial line; this is done in order to determine the actual average variation of the thickness, and therefore its "behaviour";
d) the detected values are set (input) in the computer so that they can be processed in order to program the penetration depth during the peeling step;
e) at this time all is ready for starting the peeling process of the fruits belonging to a particular gauge, and everything is done automatically;
f) before switching over to the peeling of fruits belonging to a different gauge, the statistical survey of the variation of the thickness of the peel must necessarily be performed;
g) the above steps are carried out until all fruits of the lot have been processed;
h) when a fruit 8 is put in the peeling station, this fruit is automatically set in rotation, and the same holds for the tool 6 which moves towards the fruit to a zone nearby one of the small heads 9/a or 9/b and penetrates into the skin by an amount corresponding to the projection of the tool relative to the feeler device 7; this distance is pre-set, either manually or by the operator (programmer);
i) the tool begins to move towards the other small head, advancing—for each turn of the fruit 8—by an amount "programmed" by the cam 53;
l) once the peeling is terminated, the tool 6 automatically returns in the standby or waiting position, to be ready for peeling the next fruit;
m) during the displacement of the tool 6 from one pole to the other, the projection of the tool 6 relative to the feeler device 7, and consequently the peeling depth, may or not vary, depending on how the device of the invention was programmed.

The device, conceived in the above described manner, is susceptible of various modifications and variants, all of which are included in the same inventive concept; moreover, all details are replaceable with technically equivalent ones.

What is claimed is:

1. A device for peeling pulpy fruits with a cutting depth adjustable and/or variable according to a program, specifically for oranges and other fruits having a variable-thickness skin, the device being characterized in that it comprises
   a feeler device (7), which in the peeling step is constantly elastically in contact with the surface of the fruit, to allow a tool (6) to follow the profile and size of the fruit (8), this tool being suited to cut and remove the skin in the form of a single spiral-like piece;
   a mechanism suited to drive the tool (6) according to a circular movement, having a transmission shaft consisting of two half-spindles (10, 10/a) connected by an articulated joint (19);
   a mechanism for moving the tool (6) away from a peeled fruit (8) and for causing its return to a position in contact with a successive fruit (8) to be peeled, and maintaining the tool in contact with the latter during the peeling step;
   an electronically programmable mechanism, allowing to vary the projection (a) of the tool (6) relative to said feeler device (7), in order to adjust, according to the selected program, the thickness value of the skin removed during the peeling step;
   a mechanism allowing to impart, to the tool (6), a reciprocating orbital movement (F6) around the fruit, from one pole of the fruit to its other pole, in order to be able to peel generally spherical fruits;
   a cam (53), controlling the orbital movement of the tool (6) according to various parameters like the size and shape of the fruit, the rpm imparted to the fruit, the advancement of the tool (6) for each turn of the fruit during the orbital movement;
   a program software, a distance transducer, and a step motor (32), allowing to program said electronically programmable mechanism used to vary the projection of the tool (6) relative to said feeler device (7) during the peeling step;
   means for enabling the transmission and connection in respect of other mechanisms making part of a machine on which the peeling device may be mounted.

2. A peeling device according to claim 1, wherein said feeler device (7) and said tool (6) are adjacent each other, and on the side which faces the fruit (8) the tool projects by an amount or distance (a) that may be set manually or automatically, the said projection (a) defining the penetration depth of the tool (6) inside the fruit (8).

3. A peeling device according to claim 1, wherein the said tool (6) used for peeling has a spherical shape and a chamfered edge, and is coaxially provided at the end of a half-spindle (10/a), which is in turn connected coaxially to a second half-spindle (10) by means of said articulated joint (19) which assumes the form of a universal joint; said two half-spindles (10, 10/a) being driven circularly; wherein all components are arranged in such a way that, if a fruit (8) is put in proximity of the end of the half-spindle (10/a) that carries the tool (6), said mechanism for moving the tool displaces the tool (6) towards the fruit (8) so that the tool penetrates in the fruit by an amount corresponding to its projection (a) relative to the feeler device (7), and when the feeler device (7) abuts the surface of the fruit (8) and the latter is set in rotation in the opposite direction with respect to the cutting direction of the tool (6), the assembly formed by the tool (6) and the feeler device (7) follows the variation of the shape and size of the fruit (8) by maintaining a constant penetration depth (a) of the tool (6) in the fruit (8), thereby causing the removal of a piece similar to a shaving of a turning operation, as a consequence of the fact that the half-spindle (10/a), supporting the tool and feeler device, is hinged at a point (20) corresponding to said universal joint (19) which allows the half-spindle (10/a) to tilt by an angle "α" with respect to the other half-spindle (10) and allows the feeler device (7) to constantly remain in contact with the fruit (8).

4. A peeling device according to claim 3, wherein the spindle (10, 10/a) formed by both half-spindles, and supporting the peeling tool (6), is enclosed within a tubular rod (11, 11/a), which is also realised in two sections (11, 11/a) hinged (20) at said articulated joint (19) which connects the two half-spindles (10, 10/a) to each other, thereby allowing the outside section (11/a) of the tubular rod to tilt by an angle "α" relative to the inner section (11).

5. A peeling device according to claim 3, wherein, if to the angular movement "α" of the arm carrying the tool (6) and the feeler device (7), one adds said orbital movement from one pole to the other pole, a correct combination of these two movements allows a complete peeling of the fruit (8) to be performed, with the consequent production of a single spiral like shaving resulting from the entire skin.

6. A peeling device according to claim 1, wherein said mechanism allowing to move away the tool (6) from the fruit (8) or to move it towards the fruit, is preferably formed by a pneumatically actuated linear actuator (21), that is, by a double-acting pneumatic cylinder, which acts on said tubular rod (11/a) carrying inside it the tool-bearing half-spindle (10/a), so that the tubular rod performs a pendular movement, which will be controlled depending on the presence or absence of a fruit (8) to be peeled.

7. A peeling device according to claim 6, wherein, in order to increase as much as possible the sensitivity of the contact between the feeler device (7) and the fruit (8), and in order to eliminate the stick-slip effect which is due to the seals or gaskets, the employed actuator can be a conventional actuator of a kind having no gaskets, and the pneumatic circuit used to feed the compressed air may include a pressure regulator of a kind presenting a discharge hole for the overpressure.

8. A peeling device according to claim 1, wherein said electronically programmable mechanism which allows to continuously vary the entity of the projection of the tool (6) from the feeler device (7), includes a step motor (32), a distance transducer, and a dedicated software, by means of which it is possible to program the rotation in the clockwise or anticlockwise direction of a screw (33), the latter being used to displace the feeler device (7) relative to the tool (6) with a precision of a hundredth of millimeter, in order to continuously vary the projection (a) of the tool (6) relative to the feeler device (7) after the sampling of the skin thickness variation values and their input in a computer.

9. A peeling device according to claim 1, wherein said mechanism allowing to impart a reciprocating orbital displacement (F6) to the peeling tool (6) has the feature that the following components
the spindle (10–10/a) supporting the tool (6), and the respective drive means,
the mechanism which is used to perform the pendular movement of the arm supporting the tool and the feeler device,
the mechanism which is used to vary, according to the program, the projection of the tool (6) relative to the feeler device (7), are all supported by a fork (43) hinged on a pin (38) having a vertical axis, so that by alternately rotating said fork, all components which are supported by the fork will move along a semicircle with a radius R.

10. A peeling device according to claim 9, wherein the alternate rotational movement of said fork (43), which does not occur at constant speed and must take account of the following facts
size and shape of the fruit (8),
advancement of the tool (6) for each turn of the fruit (8) to insure as much as possible a constant width of the skin shaving to be removed, may be obtained by means of a computerised numerical control unit or oil-operated hydraulic units, or in particular by a mechanism consisting of two toothed wheels, either cylindrical or conical (35–37) in shape, in which the driven wheel (37) is integral with said pin (38) and the drive wheel (35) is moved alternately by a connecting rod (44) connected to a lever (47), which in turn is moved by a motorised rotatable cam (53), wherein the profile of said cam allows to carry out the rotational alternate movement of the fork (43).

11. A peeling device according to claim 10, wherein said computerised numerical control unit comprises a step motor, a transducer of a linear or circular distance, and a dedicated software.

12. A peeling device according to claim 10, wherein said oil-operated hydraulic unit comprises in its hydraulic circuit, a proportional flow control valve or a servo-valve, which are programmable.

13. A device for peeling pulpy fruits, with a cutting depth adjustable and/or variable according to a program, used in particular for generally cylindrical fruits and/or fruits with a pear-like shape and a variable thickness of the skin, characterized in that it comprises:
a feeler device (7), which in the peeling step is constantly elastically in contact with the surface of the fruit, to allow a tool (6) to follow the profile and size of the fruit (8), this tool (6) being suited to cut the skin in the form of a single spiral-like piece;
a mechanism suited to drive the tool (6) according to a circular movement, having a transmission shaft consisting of two half-spindles (10, 10/a) connected by an articulated joint (19);
a mechanism for moving the tool (6) away from a peeled fruit (8) and for causing its return to a position in contact with a successive fruit (8) to be peeled, and maintaining the tool in contact with the latter during the peeling step;
an electronically programmable mechanism, allowing to vary the projection (a) of the tool (6) relative to said feeler device (7), in order to adjust, according to the selected program, the thickness value of the skin removed during the peeling step;

a mechanism which imparts a linear reciprocating motion to a slide (55) that supports the mechanisms used to drive the tool (6) and to adjust the displacement of the latter relative to the feeler (7);

a cam, controlling the alternate displacement of said slide, according to the size and shape of the fruit, the rpm imparted to the fruit, the advancement of the tool for each single turn of the fruit during the displacement of the slide in the peeling step;

a program software, a distance transducer, and a step motor, allowing to program said electronically programmable mechanism used to vary the amount of the projection (a) of the tool (6) relative to the feeler (7) during the peeling step, and transmission and connection means with respect to other mechanisms belonging to a machine on which the peeling device may be mounted, allowing to synchronise the different functions of the machine.

14. A peeling device according to claim 13, wherein said slide is movable on horizontal guides.

15. A peeling device according to claim 13, wherein said slide (55) is not moved at constant speed, and the following facts are taken into account:

the size and shape of the fruit (8);

the advancement of the tool (6) for each turn of the fruit, to insure as much as possible a constant width of the skin shaving to be removed; the movement of the slide being obtained by computerised numerical control units, or by oil-operated hydraulic units, or by a mechanism formed by connecting rods and/or linkages, which are actuated by a motorised rotatable cam (53) whose profile allows to realise the alternate motion of the slide (55).

16. A peeling device according to claim 15, wherein said computerised numerical control unit includes a step motor, a transducer of a circular or linear distance, and a dedicated software.

17. A peeling device according to claim 15, wherein said oil-operated hydraulic unit, includes in its hydraulic circuit a proportional flow regulation valve, or a servovalve, which are programmable.

18. A peeling device according to claim 1, wherein, if only fruits with a uniform value of the skin thickness have to be peeled, said electronically programmable mechanism allowing to vary the amount of projection (a) of the tool (6) relative to the feeler device (7), in order to vary according to the program the value of the thickness of the skin to be removed in the peeling step, may be eliminated altogether and replaced by a bracket (58) integral with the tubular rod (11/*a*), wherein, the feeler device (7) is carried by the bracket and can be manually displaced from time to time according to the thickness of the skin to be peeled, simply by first loosening and then tightening again a screw (59) that fixes the feeler device (7) to the bracket (58).

19. A peeling device according to claim 1, wherein the feeler device (7) may realize a creeping contact with the fruit (8), and in that case the material of the feeler device (7), or of that part of the latter which is in contact with the fruit, will be selected accordingly.

20. A peeling device according to claim 1, wherein the feeler device (7) realizes a rolling contact with the fruit.

\* \* \* \* \*